United States Patent [19]

Tünker

[11] Patent Number: 5,710,081
[45] Date of Patent: Jan. 20, 1998

[54] BLACK GLASS FRIT, PROCESS FOR THE PRODUCTION THEREOF AND USE THEREOF

[75] Inventor: Gerhard Tünker, Offenbach, Germany

[73] Assignee: Cerdec Aktiengesellschaft Keramische Farben, Frankfurt, Germany

[21] Appl. No.: 798,925

[22] Filed: Feb. 12, 1997

[30] Foreign Application Priority Data

Feb. 15, 1996 [DE] Germany ............... 196 05 617.9

[51] Int. Cl.$^6$ ........................... C03C 8/02
[52] U.S. Cl. ................. 501/21; 501/17; 501/23; 501/65; 501/68; 501/77; 296/84.1
[58] Field of Search .............. 501/21, 23, 24, 501/26, 61, 65, 68, 69, 75, 76, 77, 17; 296/84.1

[56] References Cited

U.S. PATENT DOCUMENTS

| | | | |
|---|---|---|---|
| 3,216,847 | 11/1965 | Armant | 117/70 |
| 3,654,505 | 4/1972 | Davis et al. | 501/75 |
| 5,250,475 | 10/1993 | Zybell et al. | 501/22 |
| 5,512,521 | 4/1996 | Fu et al. | 501/21 |

FOREIGN PATENT DOCUMENTS 1 007 296  10/1965  United Kingdom.

OTHER PUBLICATIONS

Tupy et al., *Chemical Abstracts*, vol. 90, No. 24, 11 Jun. 1979 Abstract No. 191464v.

*Primary Examiner*—Karl Group
*Attorney, Agent, or Firm*—Wenderoth, Lind & Ponack

[57] ABSTRACT

Using conventional glass frits for the production of black glass coating compositions makes it necessary also to use a relatively large quantity of black pigments. The quantity of pigment used may be reduced by using black glass frits according to the invention, thin layers of which already have a low transmission.

The glass frit according to the invention is black and contains in the glass composition (in mol. %): 10–17% of $K_2O$, 10–25% of $B_2O_3$, 15–30% of $TiO_2$, 30 to 55% of $SiO_2$, 0–5% of $Al_2O_3$, 0–5% of $Bi_2O_3$, 0.05–3% of $Fe_2O_3$ (total iron) and 0.1–3% of sulphur (total sulphur).

18 Claims, No Drawings

BLACK GLASS FRIT, PROCESS FOR THE PRODUCTION THEREOF AND USE THEREOF

DESCRIPTION

This invention relates to a black glass frit, the composition of which is substantially free of lead and cadmium. It furthermore relates to a process for the production of the black glass frit and to the use thereof for the production of glass enamels and other decorative finishes on stovable substrates.

Glass articles, in particular glass sheets, are decorated using glass coating compositions which contain one or more colouring agents and one or more glass frits. Once applied onto a substrate, the glass coating composition is stoved, wherein a glass enamel is formed. When applying glass coating compositions onto glass sheet, the melting behaviour of the glass coating compositions must be adjusted to the typical conditions of the bending and tempering process: typical stoving conditions are temperatures of between around 600° and 650° C. and firing times of a few minutes.

Especially in the automotive glass sector, there is a requirement for black glass coating compositions having very low light and UV transmission. The black colouring agents present in such glass coating compositions are usually coloured oxides based on oxides and mixed oxides of chromium, cobalt, nickel and copper. Typical values for light transmission are less than 0.1% for a stored film of approximately 30 μm in thickness. Such a transmission value is achieved by glass coating compositions which conventionally contain 15 to 30 wt. % of black colouring agents. Since the colouring agents are usually considerably more expensive than glass frits, there is a requirement for glass frits having a low light transmission which exhibit the lowest possible transmission in glass enamels having the lowest possible content of costly colouring agents.

Sulphide colouring of industrial glass with iron oxide does indeed result in the known brown sulphoferrite coloration, but not in a black coloration.

It is also known that glasses containing titanium have a yellowish to brown or blue coloration if they are melted under reducing conditions. According to DE patent 44 28 234, a glass composition based on a low-alkali borosilicate glass with the addition of 0.1 to 3 wt. % of $TiO_2$ which is melted in the presence of 0.01 to 0.1 wt. % of metallic silicon exhibits an intense blue to black coloration. As the inventors of the present invention have discovered, the colour of these glasses in thin layers of approximately 20 μm in thickness is not sufficient for the use thereof to allow an appreciable reduction in the quantity of black colouring agents used in the production of black glass coating compositions for the automotive glass sector.

A glass composition according to EP-B 0 482 535 having colouring constituents based on FeO, selenium and CoO is only grey, but not black.

For windscreens and in particular for rear windows, it must be possible to print the glass sheet coated with a glass coating composition with a conductive silver paste in order to form conductive tracks. Finally, migration of silver into the glass through the coating composition during the stoving and shaping of the sheet should be avoided, as migration results in a yellow coloration of the float glass. Another requirement for glass coating compositions for the automotive glass sector is that the molten coating composition must not adhere to the press tool during shaping of the sheet using the so-called press-bending process. The stoved glass coating composition should moreover exhibit good acid resistance to galvanoelectrolytes (pH less than 1). Finally, the glass frit contained in the glass coating composition should contain neither lead nor cadmium.

Various lead- and cadmium-free glass frits and coating preparations containing them are known among specialists for the formation of glass enamel on automotive sheet glass. These are conventionally frit systems based on a bismuth-alkali-borosilicate glass or an alkali-zinc-borosilicate glass or mixtures thereof.

Known glass frit systems are not only largely transparent, they also only partially satisfy the above-stated applicational requirements: thus the lead- and cadmium-free glass frit according to EP-A 0 267 157 is based on a content of $Na_2O$, $ZnO$, $B_2O_3$ and $SiO_2$ and may contain a few further oxides such as $Bi_2O_3$ and $Li_2O$. However, as the examples demonstrate, only those glass frits containing $Bi_2O_3$ or $Li_2O$ fulfil the melting range of distinctly below 650° C. which is required for use on glass. A disadvantage of glass frits containing lithium is that they result in a reduction in the fracture strength of glass sheet enamelled therewith.

EP-A 0 370 683 also only describes a transparent glass flux containing 45 to 65 wt. % of $Bi_2O_3$ together with coating preparations containing such a frit for the production of glass enamel. The use of such coating preparations for the production of enamelled automotive glass sheet avoids adhesion of the sheets printed therewith in the bending mould. This is achieved by a crystallization process which begins once the coating composition has melted. While glass frits having an elevated bismuth content do indeed exhibit improved properties, such frits are much more expensive, as a function of their bismuth content, than low-bismuth bismuth or bismuth-free glass frits. Moreover, the glass flux also contains 2 to 6 wt. % of $Li_2O$, which results in a distinct reduction in the fracture strength of the enamelled glass, especially with multiple prints. While a composition according to WO 92/0429 does indeed contain a crystallisable glass frit and a nucleating agent based on $Zn_2SiO_4$, a disadvantage of this glass enamel is its moderate acid resistance.

Anti-stick glass coating compositions, as are described in U.S. Pat. No. 4,959,090, contain metal powder and are suitable for use for the production of enamelled, bent sheet glass in press-bending furnaces. A disadvantage of the glass enamels produced using such compositions is their unsatisfactory acid resistance: the black colours moreover discolour to grayish or brownish hues.

The known problem of silver diffusion from a silver paste printed onto the enamel coating composition which occurs during stoving may be overcome according to EP-A 0 505 892 by using lead-free glass frits containing dissolved sulphur or sulphides; the frits are, however, not black and the elevated zinc oxide content again reduces acid resistance.

An object of the present invention is accordingly to provide a novel glass frit which is more intensely black coloured than prior art black glass frits. Another object is directed towards ensuring that the black glass frit is substantially free of constituents which are disadvantageous from a toxicological (PbO and CdO) and applicational (such as $Li_2O$ and ZnO) viewpoint. Finally, another object is directed towards ensuring that the black glass frit may be used in glass enamels for automotive glass sheet without reducing service characteristics and that the required low transmission for very thin glass sheet (approximately between 10 and 50 μm) is achieved with a smaller quantity of colouring agents to be added to the glass frit than when prior art lead- and cadmium-free glass frits are used.

This object is achieved by a black glass frit containing in the glass composition

| | | |
|---|---|---|
| $K_2O$ | 10–17 | mol. % |
| $B_2O_3$ | 10–25 | mol. % |
| $TiO_2$ | 15–30 | mol. % |
| $SiO_2$ | 30–55 | mol. % |
| $Al_2O_3$ | 0–5 | mol. % |
| $Bi_2O_3$ | 0–5 | mol. % |
| $Fe_2O_3$ | 0.05–3 | (total iron) mol. % |
| S | 0.1–3 | (total sulphur) mol. % | and oxides from the group PbO, CdO, ZnO, $Li_2O$, $Na_2O$, MgO, CaO, SrO, BaO and $P_2O_5$, each in a quantity of less than 0.5 wt. %.

A glass frit having the claimed composition, with the exception of the iron content, has been described in copending U.S. patent application Ser. No. 08/592,636, filed Jan. 26, 1996, which is based upon DE patent application 195 02 653.5. The disclosure of that application is incorporated herein by reference. A thin glass layer obtained by stoving a glass frit according to DE-P 195 02 653.5 is slightly yellowish to at best brown/black. In order to achieve an intensity sufficient for black glass enamels for the automotive glass sector, the enamel must contain 15 to 30 wt. % of black colouring agents. It was surprising that an intensely black glass frit is obtainable by adding only a small quantity of an iron source, such as an iron oxide or metallic iron, to a composition containing sulphur according to DE-P 195 02 653.5 and melting the glass-forming mixture of substances under reducing conditions. The intense intrinsic colour of the glass frit according to the invention allows the quantity of black colouring agents to be distinctly reduced in comparison with an iron-free, but otherwise identically composed frit. The form in which iron is bound in the frit according to the invention, as FeO, FeS, $Fe_2O_3$, Fe(II) titanate with tri- and/or tetravalent titanium or another form, has yet to be ascertained. The total iron content is thus stated as $Fe_2O_3$ in the claimed composition. Similarly, the total sulphur content is stated, which substantially comprises elemental sulphur and sulphide sulphur; total sulphur is recorded as $SO_3$ in the analysis of the glass frit.

A preferred glass frit contains 0.1 to 2, preferably 0.1 to 1 mol. % of $Fe_2O_3$ (total iron). Total sulphur is preferably in the range between 0.1 and 2 mol. %, in particular between 0.2 and 1 mol. %.

Apart from the obligatory and optional oxides stated according to the claims, the glass frit may additionally also contain other oxides. The content of these other oxides is conveniently limited to 5 wt. %, preferably to 3 wt. %, as a higher content may have a negative influence on physical and applicational properties. Another preferred black glass frit contains (in mol. %) 13 to 16 of $K_2O$, 18 to 23 of $B_2O_3$, 17 to 25 of $TiO_2$, 35 to 50 of $SiO_2$, 0.1 to 1 of $Fe_2O_3$ (total iron), 0.1 to 2 of S (total sulphur) and less than 3 wt. % of other metal oxides from the range of stated and unstated optional metal oxides.

As already stated, the frit according to the invention is based on $K_2O$, $B_2O_3$, $TiO_2$, $SiO_2$, $Fe_2O_3$ and S. It is moreover essential to the invention that the frit contains substantially no PbO, CdO, $P_2O_5$, ZnO, $Li_2O$, $Na_2O$ and alkaline earth metal oxides. Small proportions (less than 0.5 wt. %) of the per se unwanted oxides may enter the novel glass composition, on the one hand, as contaminants in the raw materials used for glass production and, on the other, from residues of a glass containing these unwanted substances in the glass melting furnace used. The content of these unwanted oxides is preferably kept as low as possible.

The glass frits according to the invention generally exhibit a transformation point $T_g$, measured using the DSC method (Differential Scanning Calorimetry) of below 550° C.; preferred glass frits have a transformation point of below 535° C.

The glass frits according to the invention may be melted to yield a pore-free, intensely black glass layer. After the actual melting process, crystallization effects come about which are desired with regard to the usability of the glass frit in glass coating compositions for the automotive glass sector in order to avoid adhesion during the press-bending process. The minimum melting temperature $T_s$ of preferred glass frits according to the invention is below 650° C., preferably in the range between 590° and 620° C. The minimum melting temperature $T_s$ is determined in a 4 minute firing on glass as the substrate; the assessment criterion used is the absence of pores in the melted and thus stoved glass frit. Where the application demands a lower minimum melting temperature, this may be achieved by using a mixture of a glass frit according to the invention and a prior art lead-free glass frit having a lower melting temperature.

As is clear from the Examples and Comparative Example, the glass frits according to the invention exhibit a substantially lower transmission than a similar, but substantially iron-free glass frit. The transmission of a 30 μm thick, pigment-free glass layer produced by stoving a preferred glass frit according to the invention is less than 2%, measured across the entire visible range. Transmission is only slightly dependent upon the wavelength of visible light. In comparison with iron-free glass frits which are otherwise substantially of an identical composition, the intense intrinsic colour of the glass frit according to the invention allows an appreciable reduction in the quantity of black colouring agents used in order to obtain glass enamels having a given low transparency.

The black glass frit according to the invention is obtainable by melting a mixture of conventional metal oxide forming glass raw materials in a molar composition of 10 to 17 mol. % of $K_2O$, 10 to 25 mol. % of $B_2O_3$, 15 to 30 mol. % of $TiO_2$, 30 to 55 mol. % of $SiO_2$, 0 to 5 mol. % of $Al_2O_3$, 0 to 5 mol. % of $Bi_2O_3$, 0.05 to 3 mol. % of $Fe_2O_3$ and oxides from the range PbO, CdO, ZnO, $Li_2O$, $Na_2O$, MgO, CaO, SrO, BaO and $P_2O_5$, each in a quantity of less than 0.5 wt. %, relative to the glass frit, and additionally a source of sulphur in a molar quantity which exceeds the quantity remaining in the glass frit of 0.1 to 3 mol. %, under reducing conditions at 1000° to 1200° C., quenching the melt and grinding the resultant brittle material. The reducing conditions are achieved by the presence of readily oxidizable substances in the mixture of substances to be melted, such as in particular by the presence of elemental sulphur and/or carbon. The gas atmosphere is also conveniently reducing, i.e. it is low in or substantially free of oxygen.

With the exception of $K_2O$, which is normally used as the carbonate, the raw materials used for the production of the glass frit are preferably the oxides, i.e. in particular $SiO_2$, $B_2O_3$, $TiO_2$, $Al_2O_3$ and $Bi_2O_3$. The iron content may be introduced into the batch in the form of metallic iron, an iron oxide or an Fe(II) or Fe(III) salt, such as the carbonate or sulphate. A suitable source of sulphur is particularly preferably elemental sulphur. Sulphides, sulphites and even sulphates may additionally or alternatively be used as the source of sulphur. In order to produce Ag-migration resistant frits, at least a proportion of the sulphur should be used in elemental form. The excess of the sulphur source in the glass batch is conventionally more than 10%, often 50 to 200% and above, relative to the sulphur content in the glass frit.

Potassium oxide is typically used as the sole alkali metal component. As a typical network modifier, this substance greatly reduces the viscosity of the melt and should thus be present in a quantity of at least 10 mol. %. Since the coefficient of thermal expansion of the glass frit rises sharply with an increasing $K_2O$ content, the upper limit is set at 17 mol. %. A higher $K_2O$ content results in stresses when the glass frit is used on glass substrates. The glass frit preferably contains 13 to 16 mol. % of $K_2O$. Boric acid reduces the melting point of the frit, but at a quantity of around and in particular of above 25 mol. %, acid resistance is degraded. A quantity of 18 to 23 mol. % of $B_2O_3$ is preferred. The presence of titanium dioxide, on the one hand, increases acid resistance and, on the other, at concentrations of above 15 mol. %, reduces the viscosity of the glass melt. Surprisingly, despite the relatively high titanium dioxide content in the glass composition, the glass frit according to the invention may be melted homogeneously and without premature crystallization phenomena. A preferred $TiO_2$ content is between 17 and 25 mol. %. $SiO_2$ acts as the glass former; a content of below 30 mol. % of $SiO_2$ results in an unwanted reduction in acid resistance; a content of at least 35 mol. % of $SiO_2$ and in particular of 40 to 45 mol. % is preferred. A small quantity of aluminum oxide may be present as an optional constituent in the glass composition. The presence of bismuth oxide, on the one hand, increases chemical resistance and, on the other, reduces the melting point.

Surprisingly, the stoved glass frits according to the invention also exhibit very good acid resistance to 3 wt. % hydrochloric acid at room temperature after 5 minutes' exposure. On the basis of a 5-point rating scale (1=detached; 2=abradable; 3=matt; 4=slight attack; 5=no attack), the stoved glass frit according to the invention may be assigned an acid resistance in the range between 3 and 5, preferably between 4 and 5.

By virtue of the unexpectedly favourable range of properties of the glass frits according to the invention, these may very readily be used for the production of deep black glass enamels and other ceramic decorative finishes. Coating preparations containing a glass frit and inorganic ceramic colouring pigment are used for such purposes. Such a coating preparation generally contains one or more glass frits according to the invention in a quantity of 35 to 99 wt. %, one of more colouring pigments in a quantity of 1 to 20 wt. % and one or more other lead-free glass frits in a quantity of 0 to 35 wt. %, for example those as described in the above-stated documents. Oxide pigments, for example spinel-based pigments, are preferably used in glass coating compositions for the automotive glass sector. A quantity of less than 15 wt. % of pigment in the coating preparation is usually sufficient.

The coating preparations may be applied onto the substrate in the dry state or, preferably, after conversion into a coating paste using a conventional medium, by spraying, flooding or screen printing. The coating paste contains a quantity of the coating preparation described above such that it has a consistency suitable for spraying, flooding or screen printing. The coating paste is produced using a commercial medium conventional for such purposes; screen printing media substantially contain a liquid organic, organic-aqueous or aqueous solvent suitable for suspending the solids, a polymeric organic binder and, if required, auxiliaries to adjust the rheological properties of the paste and to accelerate drying after printing.

The glass coating composition is conventionally applied by screen printing methods for the production of enamelled sheets for the automotive sector; after drying, stoving proceeds during the conventional bending and tempering process. The coating pastes according to the invention exhibit good anti-stick properties, such that they may be stoved without adhesion problems in the press-bending furnace. Stoving and shaping proceed in such furnaces at a temperature of around and in particular of below 650° C., preferably at a temperature between 610° and 640° C., with stoving times of generally between 2 and 5 minutes. If a conductive track is also to be arranged on the glass sheet, a conductive silver paste is applied, conveniently also using screen printing methods, after the glass sheet has been printed with a coating paste according to the invention and once this paste has dried. The system coated in this manner is stoved in a single firing, wherein the conductive track bonds solidly to the glass enamel layer.

The black glass frit according to the invention and the glass coating compositions produced therewith, stoved enamel layers and other decorative finishes are distinguished by a range of outstanding properties: they are deep black, exhibit excellent pore-free melting characteristics and may be stoved at low temperatures. Only once they have completely melted do crystallization phenomena occur, which is of significance with regard to use in glass enamels for glass sheet for the automotive sector shaped in the press-bending process. A further advantage is that the content of colouring agents in the glass enamel may be reduced. The intensity of the colour of the frit also makes it possible to use colouring agents in glass enamels which are entirely or substantially free of Co and Ni, so making glass coated with such a glass enamel straightforwardly recyclable. The stated articles are moreover substantially free of lead and cadmium, which is significant on environmental and toxicological grounds. Since lithium compounds are largely absent, there is no risk of a reduction in the fracture strength of glass sheet enamelled with glass frits according to the invention. Glass enamels having a glass frit according to the invention which contain dissolved sulphur moreover exhibit reduced silver diffusion. Since the glass composition contains no or only a small quantity of bismuth oxide, it is possible partially or entirely to dispense with the use of costly bismuth oxide. Finally, the elevated acid resistance of the glass enamels or ceramic decorative finishes obtained using the glass frit according to the invention should be emphasized.

EXAMPLES 1 to 4

The glass frits are produced by mixing conventional glass raw materials containing the oxides essential to the invention, the optional oxides, a source of sulphur and a source of iron. Carbon was also added to the mixture in an effective quantity as a reducing agent. Some typical compositions (in wt. %) of the batches for the production of a comparison frit and the frits according to the invention are shown in Table 1a below. The mixing ratio of the raw materials for $SiO_2$, $TiO_2$, $K_2O$, $B_2O_3$ and the iron source substantially matched that of the frit to be produced. Any deviations between the molar composition of the mixture of the glass raw materials and auxiliary substances and that of the glass frit produced therefrom are due to the loss of carbon and sulphur by complete or partial combustion and to the introduction of residues from the glass melting furnace and contaminants in the glass raw materials. Each batch was melted at approximately 1100° C. to yield a clear flux, the melt quenched by being introduced into water and the granular material ground. Table 1b shows the intended composition of the frit in wt. % and mol. % calculated from the batch for Example 1 (=Comparative Example), together with the analytical values.

TABLE 1a

Composition of frit batches in wt. %

| | Example no. | | | |
|---|---|---|---|---|
| | 1 (Comparative Example) | 2 | 3 | 4 |
| | | (According to the invention) | | |
| Quartz flour | 26.6 | 26.3 | 25.8 | 26.8 |
| Titanium dioxide | 18.2 | 18.0 | 17.8 | 17.2 |
| Potash | 21.8 | 22.0 | 21.5 | 21.5 |
| Boric acid | 28.2 | 27.8 | 28.2 | 28.5 |
| Sulphur | 3.0 | 3.0 | 3.0 | 3.0 |
| Carbon | 2.0 | 2.0 | 2.0 | 2.0 |
| Iron(II) oxide | — | 0.9 | 1.7 | — |
| Iron powder | — | — | — | 1.0 |

TABLE 1b

Intended composition (mol. % and wt. %) and analysis of Comparative Example frit

| | Mol. % Intended | Wt. % Intended | Wt. % Analysis | Mol. % Analysis |
|---|---|---|---|---|
| $SiO_2$ | 39.1 | 32.5 | 33.7 | 40.7 |
| $Al_2O_3$ | — | — | 0.4*) | 0.3 |
| $Na_2O$ | — | — | 0.1*) | 0.1 |
| $K_2O$ | 14.0 | 18.3 | 19.5 | 15.0 |
| $B_2O_3$ | 20.2 | 19.6 | 21.0 | 21.9 |
| $TiO_2$ | 20.4 | 22.6 | 23.6 | — |
| $SO_3$ | 6.3 | 7.0 | 0.7 | 0.6 |
| Miscellaneous substances | — | — | 1.0 **) | ***) |
| $Fe_2O_3$ | — | — | 0.3*) | ***) |

*)typical contaminants from raw materials and melting furnace
**)ignition loss and other metal oxides
***)calculation in mol. % without miscellaneous substances and $Fe_2O_3$ Table 2 shows the measured properties of the frits.

• Hue and transmission, measured in % at a wavelength of 550 nm of a 30 μm thick layer of glass frit without colouring agent stoved at 640° C. within 4 minutes on glass.

• Transformation point $T_g$ using DSC method and minimum melting temperature $T_s$ in a 4 minute firing on glass.

Acid resistance (AR) of the stoved coating composition to 3% Hcl at room temperature after 5 minutes' exposure (5 point scale: 1=detached; 2=abradable; 3=matt; 4=slight attack; 5=no attack).

TABLE 2

Properties of glass frit

| | Comparative Example | Examples | | |
|---|---|---|---|---|
| | 1 | 2 | 3 | 4 |
| Hue | olive | black | black | black |
| Transmission in % | 47.1 | 1.4 | 0.9 | 0.8 |
| $T_g$ in °C. | 535 | 533 | 531 | 530 |
| $T_s$ in °C. | 625 | 625 | 620 | 620 |
| AR | 4 | 4 | 4 | 4 |

EXAMPLES 5 to 8

Production of Black Glass Enamel on Automotive Glass

The starting frits used were that from Example 1 and that from Example 3. The colouring agent used was a conventional commercial spinel-based black pigment. The frit and pigment were mixed together in the stated ratio (Table 3) while dry and worked to a paste using a conventional screen printing medium (Cerdec 80893) by means of a mixer and three-roll mill. The resultant coating pastes were printed on the bath side of 4 mm green glass using a 62 T printing screen and dried at 130° C. Firing was performed under constant conditions for 4 minutes at a furnace temperature of 660° C. Table 3 shows pigment content, transmission and acid resistance (rating scale). Decorative finishes having better gloss may be obtained thanks to the lower pigment content which is possible according to the invention.

TABLE 3

| Example No. | | Frit (no./ parts by weight) | Colouring agent (parts by weight) | Transmission (%) | Acid resistance |
|---|---|---|---|---|---|
| 5 | Comparison | 1/78 | 22 | 0.2 | 4 |
| 6 | | 1/90 | 10 | 2.4 | 4 |
| 7 | Invention | 3/78 | 22 | <0.01 | 4 |
| 8 | | 3/90 | 10 | 0.17 | 4 |

What is claimed is:

1. A black glass frit containing in the glass composition

| $K_2O$ | 10–17 | mol. % |
|---|---|---|
| $B_2O_3$ | 10–25 | mol. % |
| $TiO_2$ | 15–30 | mol. % |
| $SiO_2$ | 30–55 | mol. % |
| $Al_2O_3$ | 0–5 | mol. % |
| $Bi_2O_3$ | 0–5 | mol. % |
| $Fe_2O_3$ | 0.05–3 | (total iron) mol. % |
| S | 0.1–3 | (total sulphur) mol. % | and oxides from the group of PbO, CdO, ZnO, $Li_2O$, $Na_2O$, MgO, CaO, SrO, BaO and $P_2O_5$, each in a quantity of less than 0.5 wt. %.

2. A glass frit according to claim 1, containing 0 1 to 1 mol. % of $Fe_2O_3$ and 0.1 to 2 mol. % of S.

3. A glass frit according to claim 1 containing

| $K_2O$ | 13–16 | mol. % |
|---|---|---|
| $B_2O_3$ | 18–23 | mol. % |
| $TiO_2$ | 17–25 | mol. % |
| $SiO_2$ | 35–50 | mol. % |
| $Fe_2O_3$ | 0.1–1 | mol. % |
| S | 0.1–2 | mol. % |
| $Bi_2O_3$ | 0–3 | mol. % | and less than 3 wt. % of other metal oxides.

4. A glass frit according to claim 2 containing

| $K_2O$ | 13–16 | mol. % |
|---|---|---|
| $B_2O_3$ | 18–23 | mol. % |
| $TiO_2$ | 17–25 | mol. % |
| $SiO_2$ | 35–50 | mol. % |
| $Fe_2O_3$ | 0.1–1 | mol. % |
| S | 0.1–2 | mol. % |
| $Bi_2O_3$ | 0–3 | mol. % | and less than 3 wt. % of other metal oxides.

5. A glass frit according to claim 1 having a minimum melting temperature $T_s$ in a 4 minute firing of below 650°.

6. A glass frit according to claim 5 wherein the minimum melting temperature $T_s$ is in the range of from 590° to 620° C.

7. A glass frit according to claim 1, wherein
the transmission thereof for a 30 μm thick stoved glass layer is less than 2%.

8. A process for the production of a black glass frit having a composition according to claim 1, wherein
a mixture of conventional metal oxide forming glass raw materials in a molar composition of 10 to 17 mol. % of $K_2O$, 10 to 25 mol. % of $B_2O_3$, 15 to 30 mol. % of $TiO_2$, 30 to 55 mol. % of $SiO_2$, 0 to 5 mol. % of $Al_2O_3$, 0 to 5 mol. % of $Bi_2O_3$, 0.05 to 3 mol. % of $Fe_2O_3$ and oxides selected from the group consisting of PbO, CdO, ZnO, $Li_2O$, $Na_2O$, MgO, CaO, SrO, BaO and $P_2O_5$, each in a quantity of less than 0.5 wt. %, relative to the glass frit, And additionally a source of sulphur in a molar quantity which exceeds the quantity remaining in the glass frit of 0.1 to 3 mol. %, is melted under reducing conditions at 1000° to 1200° C. the melt is quenched thereby forming a brittle material and the brittle material is ground.

9. A process according to claim 8 wherein
the mixture to be melted contains elemental sulphur as the source of sulphur and wherein the melting is conducted in a reducing gas atmosphere.

10. Process according to claim 8, wherein
the mixture to be melted additionally contains carbon.

11. A glass enamel composition which comprises a black glass frit as defined in claim 1 and at least one colouring pigment.

12. A composition according to claim 11 wherein the black frit glass frit is present in an amount of 35 to 99% by weight and the colouring pigment is present in an amount of 1 to 20% by weight.

13. A composition according to claim 12 wherein at least one other lead-free glass frit is present in an amount of up to 35% by weight.

14. A composition according to claim 11 which contains a screen printing medium.

15. A method for producing a glass enamel or decorative finish on a stovable substrate which comprises applying a composition as defined in claim 11 to a stovable substrate and subsequently firing said substrate.

16. A method according to claim 15 wherein said stovable substrate is automotive glass.

17. A substrate having a glass enamel or decorative finish fired thereon produced in accordance with the method of claim 15.

18. A substrate as defined in claim 17 wherein said substrate is automotive glass.

* * * * *